(12) United States Patent
Gautieri et al.

(10) Patent No.: US 6,367,497 B1
(45) Date of Patent: Apr. 9, 2002

(54) CONTROL SYSTEM FOR ON-OFF VALVES RESULTING IN PROPORTIONAL RESPONSE

(75) Inventors: Steven Gautieri, Gladstone; Allen Leon Maag, Savannah; David Lavern Ross, St. Joseph, all of MO (US)

(73) Assignee: Altec Industries, Inc., Birmingham, AL (US)

(*) Notice: Subject to any disclaimer, the term of this patent is extended or adjusted under 35 U.S.C. 154(b) by 0 days.

(21) Appl. No.: 09/799,266

(22) Filed: Mar. 5, 2001

(51) Int. Cl.[7] .................................................. G05D 7/00
(52) U.S. Cl. ........................ 137/9; 137/613; 137/487.5
(58) Field of Search ................................ 137/613, 485, 137/487.5, 9

(56) References Cited

U.S. PATENT DOCUMENTS

| | | |
|---|---|---|
| 4,106,368 A | 8/1978 | Ivey |
| 5,233,910 A * | 8/1993 | Laichinger et al. . 137/625.49 X |
| 6,019,441 A | 2/2000 | Lloyd et al. |

FOREIGN PATENT DOCUMENTS

DE 230884 B 9/1993

* cited by examiner

Primary Examiner—Kevin Lee
(74) Attorney, Agent, or Firm—Hovey Williams LLP

(57) ABSTRACT

A valve control system (10) for achieving proportional response using inexpensive on-off valves (16) commonly used in machine and robotic applications and other pneumatic/hydraulic systems. A proportional response is achieved from each on-off valve (16) by interposing a single continuously proportional inlet valve (18) actuated by linear or non-linear signals to regulate the transfer of a media, whether air or fluid, to the actuated on-off valve (16) via a common galley (22). The actuation signals are preferably provided by a microcontroller (14) that can be programmed with more than one algorithm for generating different types of actuation signals. Furthermore, a non-linear mechanical response can be linearized by generating a non-linear actuation signal to produce a non-linear media transfer which when combined with the non-linear mechanical response results in an overall linear response.

26 Claims, 4 Drawing Sheets

CONTROL SYSTEM FOR ON-OFF VALVES RESULTING IN PROPORTIONAL RESPONSE

BACKGROUND OF THE INVENTION

1. Field of the Invention

The present invention relates to systems for controlling valve response. More particularly, the invention relates to systems for controlling the response of solenoid-operated, pneumatic/hydraulic, discrete, low-cost on-off valves commonly used in machine and robotic applications.

2. Description of the Prior Art

In pneumatic/hydraulic systems requiring valves, it is often highly desirable to use simple, low cost on-off valves, so-called "bang-bang" valves, for controlling the transfer of media. Unfortunately, unlike more complex and expensive fully proportional valves, on-off valves actuate abruptly, which stresses mechanical parts, jars loads, and makes intricate movements difficult. Thus, though simple and economical, on-off valves are presently not well-suited for use in some systems and applications.

For example, an aerial truck, or "bucket truck", has a hydraulic, valve-actuated boom with a platform or enclosure located at one end thereof for carrying a worker. The boom is operable to raise and position the worker for performing, for example, work on pole-mounted electrical transformers, telephone wires, or television cables. If the hydraulic valves controlling the boom provide jerky rather than smooth movements, the boom could be dangerously stressed, or the enclosure or worker could be jarred into contact with the electrical lines, wires, or cables, or inadvertently brought into injurious contact with nearby structures.

For these and other reasons an improved valve control system is needed whereby a proportional response can be achieved with minimal expense and complexity using low cost on-off valves.

SUMMARY OF THE INVENTION

The control system of the present invention includes novel enabling technology that overcomes the disadvantages of existing valve control systems to make the use of low-cost on-off valves practical in applications for which they were previously not well suited. A proportional response is achieved from a on-off valve by interposing a single continuously proportional inlet valve controlled by ramp-like or non-linear signals to regulate the transfer of a media, whether gas or fluid, to the one or more actuated on-off valves and to the functions associated with those valves. The signals are preferably provided by a microcontroller that can be preprogrammed to produce a variety of signal types, including ramp, ramp-like, and non-linear.

The result is a relatively simple, low-cost valve system providing a greater degree of control and smoothness of media transfer than is currently available without using numerous expensive proportional valves or complex valve actuation schemes. The preferred control system also allows for application specific customization, including linearization of non-linear mechanical responses.

These and other important aspects of the present invention are more fully described in the section entitled DETAILED DESCRIPTION OF A PREFERRED EMBODIMENT, below.

BRIEF DESCRIPTION OF THE DRAWINGS

A preferred embodiment of the present invention is described in detail below with reference to the attached drawing figures, wherein.

DESCRIPTION OF A PREFERRED EMBODIMENT

Figure 1:
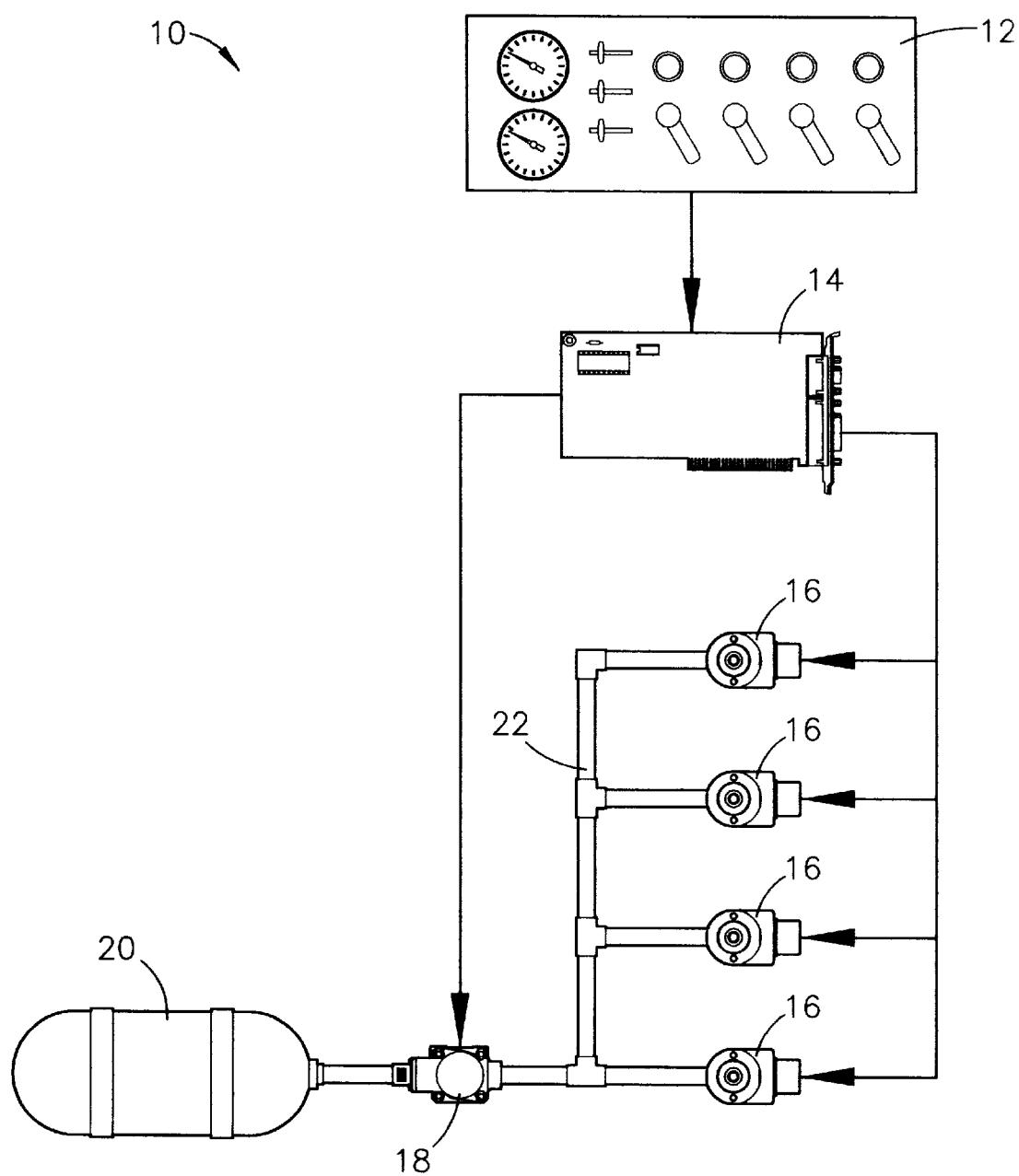
FIG. 1 is a block diagram of the major components of a preferred embodiment of the control system of the present invention.

FIG. 1 shows a valve control system 10 operable to control common low-cost on-off valves so as to provide the smooth, proportional response of more complex and expensive fully proportional valves. The control system 10 may be used in any application involving pneumatic/hydraulic valves from which a proportional response is desirable, including the hydraulic, valve-actuated booms of aerial vehicles. The preferred control system 10 is shown broadly comprising user controls 12; a microcontroller 14; a plurality of on-off valves 16; a proportional inlet valve 18; and a media reservoir 20.

The user controls 12 correspond to mechanical functions associated with one or more on-off valves, and are operable to send action signals to the microcontroller 14 indicative of the function to be performed. The controls 12 may include switches, dials, levers, or any other commonly used control device.

The microcontroller 14 receives the action signals generated by the user controls 12 and generates corresponding signals controlling actuation of one or more on-off valves 16 and the proportional inlet valve 18. The microcontroller 14 may be any computing device and may include a microprocessor or digital signal processor. One example of a microcontroller that may be used with the present invention is available from Microchip Technologies. In the present invention, though each on-off valve appears to provide a proportional response, proportionality is actually achieved at the single main inlet valve 18 and merely manifests itself at each on-off valve. Thus, the microcontroller 14 sends full-on or full-off (i.e., step function) first-type actuation signals to the appropriate on-off valves 16, and a proportional second-type actuation signal, preferably ramp, ramp-like, or non-linear, to the proportional inlet valve 18 in the form of a variable pulse width modulated (PWM) current or voltage control signal.

Figure 2:
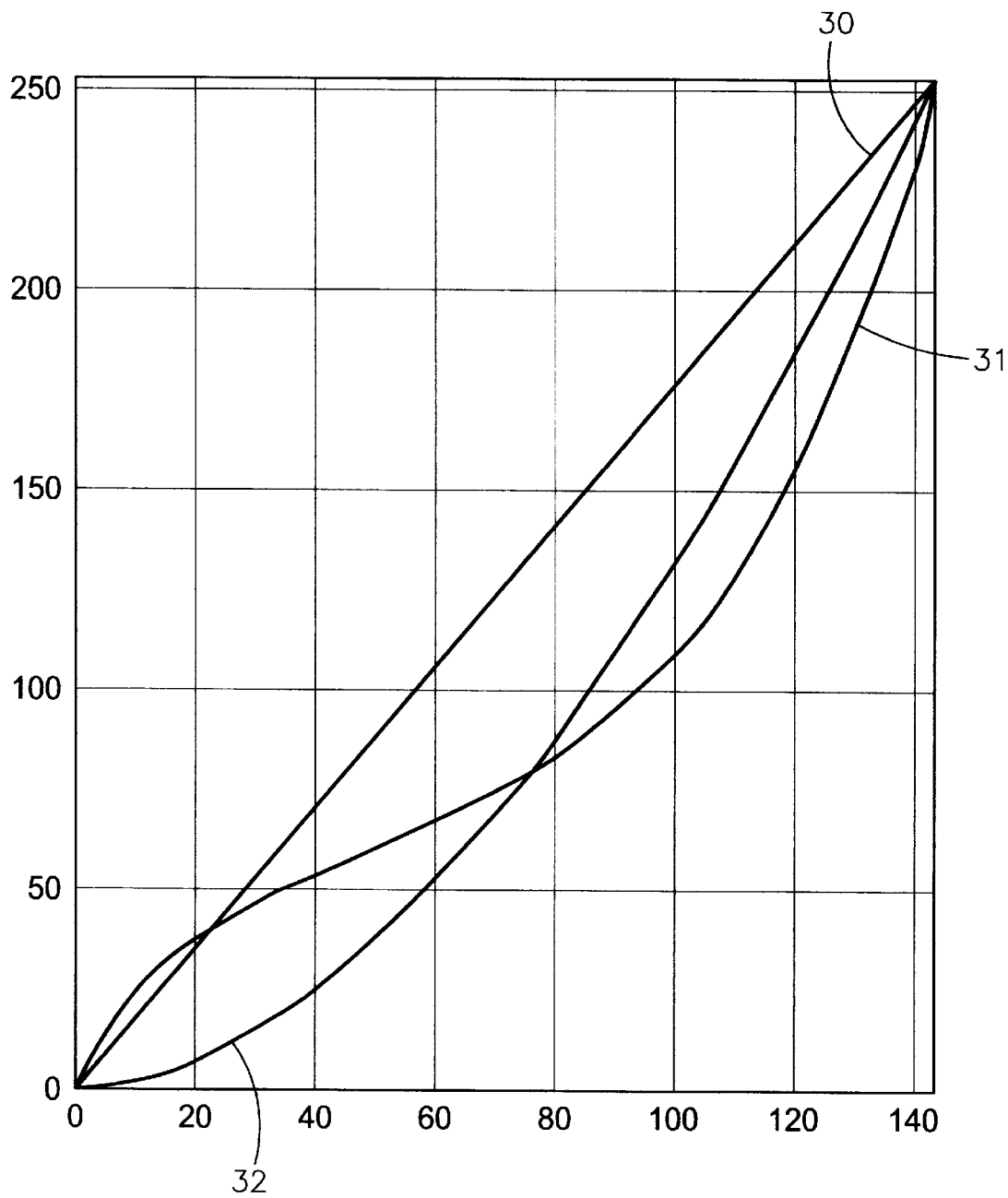
FIG. 2 is a graph showing various actuation signals produced by the control system of FIG. 1.

Preferably, the microcontroller 14 includes a programmable memory component operable to receive and store a number of different algorithms for generating different second-type actuation signals as required or desirable. FIG. 2 shows three example signals, including a ramp signal 30, and two non-linear ramp-like signals 31,32.

Figure 3:
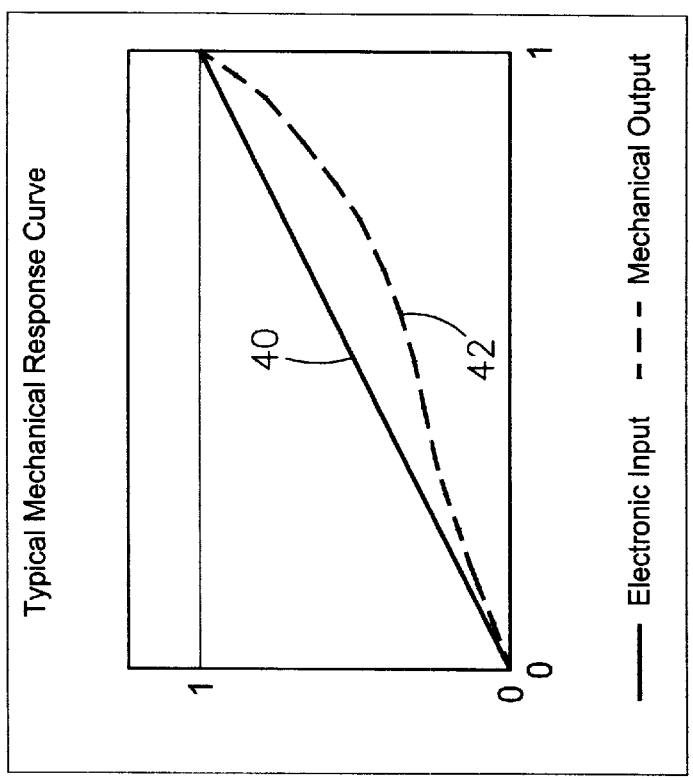
FIG. 3 is a graph showing a typical mechanical response curve associated with a non-compensating control system.

Also, because most pneumatic/hydraulic systems are not completely linear in their mechanical operation, it is sometimes desirable to generate particular second-type actuation signals to "linearize" the mechanical response of the particular function. FIG. 3, for example, shows a non-compensating, linear electronic input 40 to the proportional valve 18, and a corresponding undesirably non-linear mechanical output 42. The control system responsible for generating the electronic input 40 wrongly assumed that the mechanical output 42 would closely track the input ramp signal 40.

Figure 4:
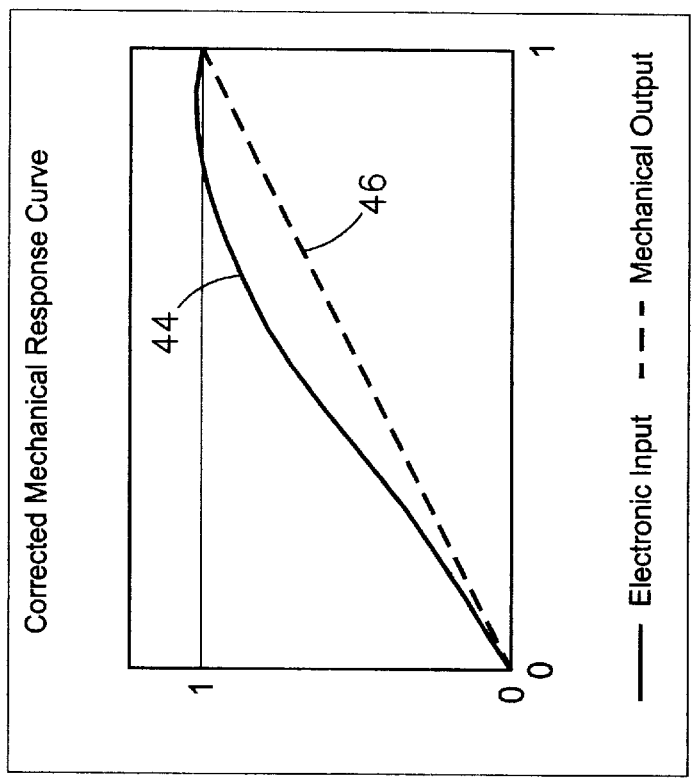
FIG. 4 is a graph showing a corrected mechanical response curve associated with a preferred embodiment of the control system of the present invention.

By contrast, referring to FIG. 4, a preferred embodiment of the control system 10 of the present invention is able to generate a non-linear electronic input signal 44 (i.e., second-type actuation signal) to produce a non-linear proportional valve response, which is opposite the expected mechanical response 42 shown in FIG. 3, in order to result in the desired linear output 46. That is, the preferred control system is operable to recognize and compensate for the true behavior of the mechanical system to result in the desired ramp response 46.

The on-off valves 16 are preferably common solenoid-operated, pneumatic/hydraulic, discrete, low-cost on-off valves typically used in machine and robotic applications. These valves are commonly called "bang-bang" valves because of their abrupt start-stop actuation. The on-off valves 16 are operable to receive both an electrical signal defining the state of valve actuation (open or closed), and available pneumatic or hydraulic media for subsequent transfer through the on-off valve 16 to the associated mechanical function. As mentioned above, proportionality is achieved by using the proportional inlet valve 18 to control the rate of media transfer to the fully actuated on-off valve 16.

The main proportional inlet valve 18 is operable to regulate the transfer of media from a reservoir 20 to the on-off valves 16 via a common galley 22 in response to the second-type actuation signal generated by the microcontroller 14. The second-type actuation signal determines the rate at which media is transferred from the reservoir 20 to the on-off valves 16, and thereby produces the apparent proportionality of the on-off valves' response.

The reservoir 20 is any suitable media source commonly associated with pneumatic or hydraulic systems. The media can be any suitable gas or fluid, including air, oil, water, etc.

In operation, an operator activates the controls 12 to send action signals to the microcontroller 14. The microcontroller 14 responds by sending a first-type actuation signal to fully actuate one or more of the on-off valve(s) 16, and a second-type actuation signal to the proportional inlet valve 18. The second-type actuation signal is preferably ramp-like, whether linear or non-linear. It may be desirable to provide the microcontroller 14 with a variety of different stored algorithms from which to choose for generating the second-type actuation signal. The proportional inlet valve 18 responds to the second-type actuation signal by transferring media from the reservoir 20 to the on-off valve 16 via a common galley 22.

When the action signal terminates, the microcontroller 14 quickly ramps-down the second-type actuation signal, thereby softening the pinch-off of flow to the actuated on-off valve 16 and the associated function. At the end of the ramp-down, the on-off valve 16 is closed, or "de-actuated".

Where first and second on-off valve openings overlap, the microcontroller 14 can modulate system media flow so as to result in a smooth transfer of media to the second on-off valve 16. Such overlapping valve actuations give the operator the impression of even smoother, continuous movement.

Figure 5:
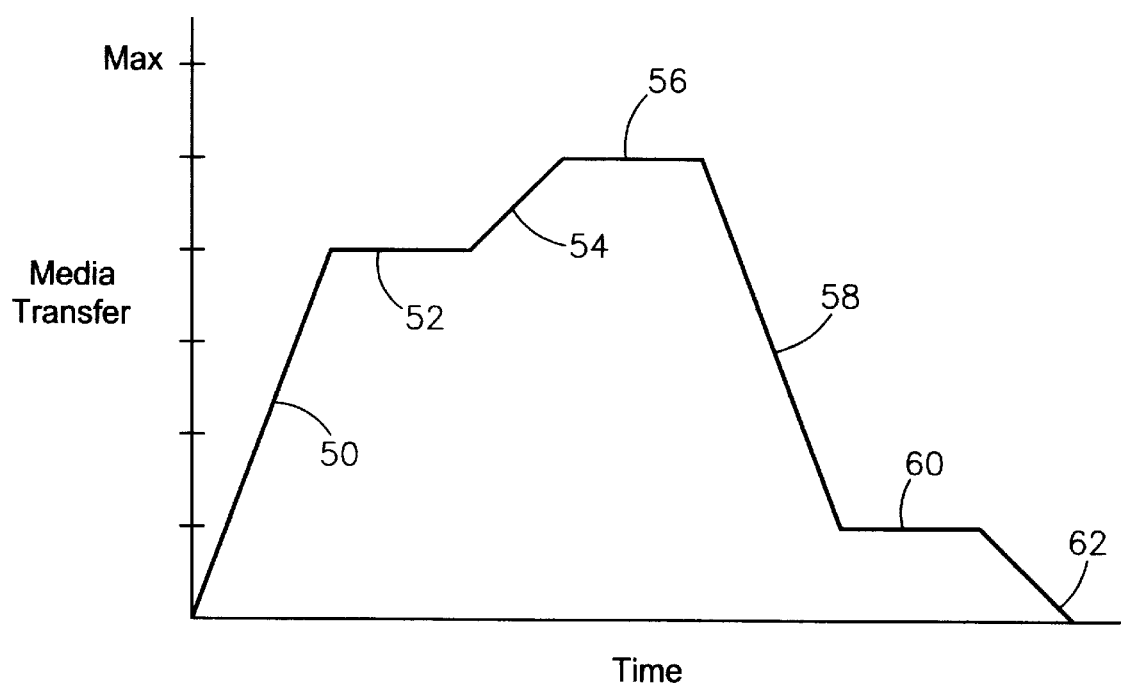
FIG. 5 is a graph showing overlapping media transfer to two on-off valves.

For example, referring to FIG. 5, a first on-off valve 16 is opened when a user initiates a first action. Media transfer is accomplished by applying a first ramp-up function to the proportional valve 18, as indicated by line 50. Once the desired degree of media transfer is achieved, the proportional valve 18 ceases further actuation, thereby maintaining a steady media flow, as indicated by line 52. The user then initiates a second action causing a second on-off valve 16 to open, requiring additional media transfer accomplished by applying a second ramp-up function to the proportional valve 18, as indicated by line 54. Note that the first and second ramp-up functions need not be identical. Again, once the desired degree of media transfer is achieved, the proportional valve 18 ceases further actuation, as indicated by line 56, to maintain the desired media flow. Additional on-off valves 16 may be opened as desired and media transferred thereto until the proportional valve 18 is fully actuated and media flow is at its maximum.

At some later time, a first ramp-down function occurs when the user terminates the first action. The ramp down function is applied to the proportional valve 18 to reduce media transfer to the actuated on-off valves 16, as indicated by line 58. Once a desired flow rate is reached, the first on-off valve 16 is closed and the proportional valve 18 ceases further deactivation to maintain a desired media flow to the still open second on-off valve 16, as indicated by line 60. Still later, the user terminates the second action, thereby causing a second ramp down function to be applied to the proportional valve 18 to reduce media flow to zero, as indicated by line 62. When media flow ceases, the second on-off valve 16 is closed.

From the preceding description, it can be seen that the electronic soft start/stop, solenoid valve control system of the of the present invention uses a single proportional inlet valve combined with a plurality of low-cost on-off valves to economically achieve proportional responses that previously required a more complex system typically employing multiple expensive proportional valves or additional electronics.

Applications are contemplated for the control system herein described that require only minor modifications to the system as disclosed. Thus, although the invention has been described with reference to the preferred embodiment illustrated in the attached drawings, it is noted that equivalents may be employed and substitutions made herein without departing from the scope of the invention as recited in the claims. For example, the functions of the microcontroller are preferably implemented using a microprocessor, but may, where desirable and practical, be alternatively implemented using a simple primitive electronic circuit or a sophisticated computer.

Having thus described the preferred embodiment of the invention, what is claimed as new and desired to be protected by Letters Patent includes the following:

1. A valve control system operable to control the rate at which a media is transferred, the valve control system comprising:

a signal source operable to provide a first-type actuation signal and a second-type actuation signal;

at least one on-off valve operable to fully actuate in response to the first-type actuation signal; and a proportional valve operable in response to the second-type actuation signal to proportionally actuate and transfer media to the on-off valve.

2. The valve control system of claim 1, the first-type actuation signal being a step function signal.

3. The valve control system of claim 1, the second-type actuation signal being a ramp function signal.

4. The valve control system of claim 1, the second-type actuation signal being a non-linear signal.

5. The valve control system of claim 1, the signal source including a microcontroller.

6. The valve control system of claim 1, the signal source including a computer.

7. The valve control system of claim 1, the signal source being further operable to provide more than one type of second-type actuation signal.

8. The valve control system of claim 1, the media being a gas.

9. The valve control system of claim 1, the media being a fluid.

10. The valve control system of claim 1, further including user controls operable to initiate a desired mechanical function by causing the signal source to provide the first-type and second-type actuation signals.

11. The valve control system of claim 10, the user controls including at least one of the following: switches, dials, levers, joy-sticks, buttons.

12. A valve control system operable to control the rate at which a media is transferred, the valve control system comprising:

user controls operable to provide an action signal to initiate a desired mechanical function;

a microcontroller operable in response to the action signal to provide a first-type actuation signal and a second-type actuation signal;

at least one on-off valve operable in response to the first-type actuation signal to fully actuate; and a proportional valve operable in response to the second-type actuation signal to proportionally actuate and transfer media to the on-off valve.

13. The valve control system of claim 12, the user controls including at least one of the following: switches, dials, levers, joy-sticks, buttons.

14. The valve control system of claim 12, the first-type actuation signal being a step function signal.

15. The valve control system of claim 12, the second-type actuation signal being a ramp function signal.

16. The valve control system of claim 12, the second-type actuation signal being a non-linear signal.

17. The valve control system of claim 12, the microcontroller being further operable to provide more than one type of second-type actuation signal.

18. The valve control system of claim 12, the media being a gas.

19. The valve control system of claim 12, the media being a fluid.

20. A method of providing a linear mechanical action resulting from a non-linear mechanical response, the non-linear mechanical response corresponding to the transfer of a media by at least one on-off valve, the method comprising the steps of:

(a) interposing a proportional valve between a media source and the on-off valve, the proportional valve being operable to regulate the transfer of media;

(b) providing a first-type actuation signal to fully actuate the on-off valve; and (c) providing a second-type actuation signal to proportionally actuate the proportional valve and thereby regulate the rate of media transfer to the on-off valve, the second-type actuation signal being operable to produce a non-linear media transfer response which, when combined with the non-linear mechanical response, results in the linear mechanical action.

21. The method as set forth in claim 20, the linear mechanical action being characterized by a ramp function.

22. The method as set forth in claim 20, the first-type and second-type actuation signals being provided by a microcontroller.

23. The method of as set forth in claim 22, the microcontroller including a microprocessor or a digital signal processor.

24. The method as set forth in claim 20, the media being a gas.

25. The method as set forth in claim 20, the media being a fluid.

26. A method of handling a plurality of on-off valves with a single proportional valve and a set of user controls to provide action signals to each on-off valve, each on-off valve having one or more individual characteristics of operation, the method comprising the steps of:

(a) interposing the proportional valve between a media source and the on-off valves, the proportional valve being operable to regulate a transfer of media from the media source;

(b) providing a first-type actuation signal to fully actuate any one or more of the on-off valves; and (c) providing a second-type actuation signal to the proportional valve to proportionally regulate the transfer of media corresponding to any combination of the action signals while retaining the individual characteristics of operation of each on-off valve.

* * * * *